(12) United States Patent
Leng et al.

(10) Patent No.: US 11,777,568 B2
(45) Date of Patent: Oct. 3, 2023

(54) PMI-BASED DATA BEAM NULLING WITH A CSI REPORT

(71) Applicant: Samsung Electronics Co., Ltd., Suwon-si (KR)

(72) Inventors: Shiyang Leng, Allen, TX (US); Hao Chen, Plano, TX (US); Ahmed Atef Ibrahim Ibrahim, Plano, TX (US); Namjeong Lee, Suwon-si (KR); Sooyoung Hur, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/806,068

(22) Filed: Jun. 8, 2022

(65) Prior Publication Data

US 2023/0033259 A1    Feb. 2, 2023

Related U.S. Application Data

(60) Provisional application No. 63/225,244, filed on Jul. 23, 2021.

(51) Int. Cl.
*H04B 7/0456* (2017.01)
*H04L 1/00* (2006.01)

(52) U.S. Cl.
CPC ......... *H04B 7/0486* (2013.01); *H04L 1/0009* (2013.01)

(58) Field of Classification Search
CPC .... H04B 7/0486; H04L 1/0009; H04L 1/0026
See application file for complete search history.

(56) References Cited

U.S. PATENT DOCUMENTS

| 8,891,399 | B2 | 11/2014 | Seo et al. |
| 9,325,402 | B2 | 4/2016 | Han et al. |
| 10,333,681 | B2 | 6/2019 | Kwak et al. |
| 10,348,384 | B1 | 7/2019 | Ni et al. |

(Continued)

FOREIGN PATENT DOCUMENTS

| WO | 2020215105 A2 | 10/2020 |
| WO | 2021062875 A1 | 4/2021 |

OTHER PUBLICATIONS

International Search Report and Written Opinion dated Oct. 6, 2022 regarding International Application No. PCT/KR2022/009206, 6 pages.

*Primary Examiner* — Sung S Ahn

(57) ABSTRACT

Apparatuses and methods for precoding matrix indicator (PMI)-based data beam nulling with a channel state information (CSI) report. An apparatus includes a transceiver configured to communicate via a wired or wireless communication medium and a processor coupled to the transceiver. The processor is configured to identify restricted PMI beams in a nulling direction for supported ranks; receive, via the transceiver from a user equipment (UE), a CSI report including a rank, a PMI, and channel quality indicator (CQI) feedback; and determine whether the reported PMI is restricted. The processor is further configured to select an alternative PMI among a number of unrestricted PMIs for the reported rank; boost a reported CQI if a reduced transmit power is configured; and select a modulation coding scheme (MCS) and generate a precoder for a data beam based on at least one of: the CSI report, the alternative PMI, and the boosted CQI.

20 Claims, 10 Drawing Sheets

(56) References Cited

U.S. PATENT DOCUMENTS

| | | |
|---|---|---|
| 10,924,163 B2 | 2/2021 | Dayvdov et al. |
| 2012/0076028 A1* | 3/2012 | Ko .................... H04B 7/0417 |
| | | 370/252 |
| 2020/0137591 A1 | 4/2020 | Smith et al. |
| 2020/0145153 A1 | 5/2020 | Ma et al. |
| 2020/0244335 A1 | 7/2020 | Nilsson et al. |
| 2021/0006302 A1 | 1/2021 | Nayeb Nazar et al. |
| 2021/0152239 A1 | 5/2021 | Guha et al. |
| 2021/0159953 A1 | 5/2021 | Wu et al. |
| 2021/0352702 A1* | 11/2021 | Ma ........................ H04L 1/001 |

* cited by examiner

PMI-BASED DATA BEAM NULLING WITH A CSI REPORT

CROSS-REFERENCE TO RELATED APPLICATIONS AND CLAIM OF PRIORITY

The present application claims priority to U.S. Provisional Patent Application No. 63/225,244, filed on Jul. 23, 2021. The contents of the above-identified patent documents are incorporated herein by reference.

TECHNICAL FIELD

The present disclosure relates generally to a diverse networks and, more specifically, the present disclosure relates to data beam nulling.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency, coverage, and quality of service are of paramount importance.

SUMMARY

The present disclosure relates to precoding matrix indicator (PMI)-based data beam nulling with a channel state information (CSI) report.

In an embodiment, an apparatus is provided. The apparatus includes a transceiver configured to communicate via a wired or wireless communication medium and a processor coupled to the transceiver. The processor is configured to identify restricted PMI beams in a nulling direction for supported ranks; receive, via the transceiver from a user equipment (UE), a CSI report including a rank, a PMI, and channel quality indicator (CQI) feedback; and determine whether the reported PMI is restricted. The processor is further configured to select an alternative PMI among a number of unrestricted PMIs for the reported rank; boost a reported CQI if a reduced transmit power is configured; and select a modulation coding scheme (MCS) and generate a precoder for a data beam based on at least one of: the CSI report, the alternative PMI, and the boosted CQI.

In another embodiment, a method is provided. The method includes identifying restricted PMI beams in a nulling direction for supported ranks; receiving, from a UE, a CSI report including a rank, a PMI, and CQI feedback; and determining whether the reported PMI is restricted. The method further includes selecting an alternative PMI among a number of unrestricted PMIs for the reported rank; boosting a reported CQI based on a reduced transmit power being configured; and selecting a MCS and generating a precoder for a data beam based on at least one of: the CSI report, the alternative PMI, and the boosted CQI.

In yet another embodiment, a non-transitory computer readable medium is provided. The non-transitory computer readable medium comprises program code, that when executed by a processor of an apparatus, causes the apparatus to: identify restricted PMI beams in a nulling direction for supported ranks; receive, via a transceiver of the apparatus from a UE, a CSI report including a rank, a PMI, and CQI feedback; determine whether the reported PMI is restricted; select an alternative PMI among a number of unrestricted PMIs for the reported rank; boost a reported CQI if a reduced transmit power is configured; and select a MCS and generate a precoder for a data beam based on at least one of: the CSI report, the alternative PMI, and the boosted CQI.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, a reference is now made to the following description taken in conjunction with the accompanying drawings, in which like reference numerals represent like parts.

DETAILED DESCRIPTION

Figure 1:
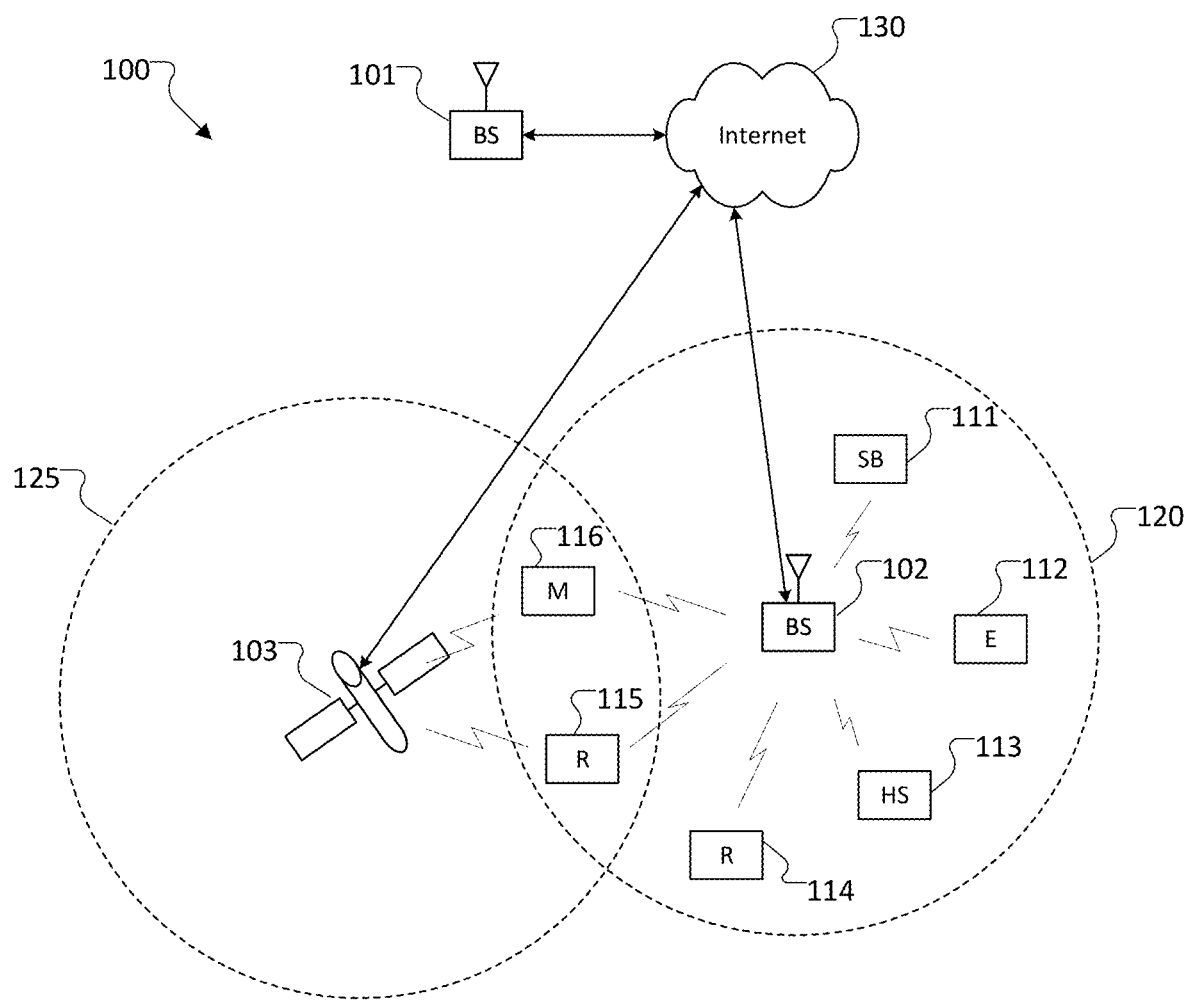
FIG. 1 illustrates an example wireless network according to embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Aspects of the present disclosure may also be applied to deployment of 5G communication system, 6G or even later release which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

In many cases, cellular networks are deployment in locations where satellite earth-stations (ES) exist. Cellular operation bands can be adjacent to ES operation band. There are harsh constraints on the amount of interference that ES can tolerate in their band of operation. Even though cellular networks are operating in a different adjacent band, out of band (OOB) emission still affects ES. Hence, transmission back-off is required to avoid OOB interference.

Power reduction is one way to reduce interference to ESs, which, however, will cause a smaller coverage and performance degradation. In order to reduce interference to ESs while maintaining coverage and mitigating performance degradation, PMI-based data beam can be designed so that the radiation power is reduced directionally towards the ES, referring to as directional nulling. Methods of directional nulling of PMI-based data beam need to be designed.

For beam generating for different ranks, the PMI bitmaps are different. To reduce overhead in control channel or due to system capability, the BS can set only one CSI report configuration, so that a single PMI bitmap is configured for the UE to report PMIs for different ranks. In this case, the configured PMI bitmap may not accurately indicate restricted and unrestricted PMIs for a certain rank, that is, although a reported PMI is unrestricted according to the configured PMI bitmap, the reported PMI may need to be restricted and replaced by alternative ones by the BS. On the other hand, the reported CQI can be measured based on power-reduced CSI-RS if power-reduced CSI-RS is used by the BS for ES interference control, so reported CQI may not be proper for full-power beam generation. To transmit a full-power data beam directionally nulled in ES direction, the reported CQI is be boosted for MCS (Modulation Coding Scheme) selection. Regarding these two issues, embodiments of the present disclosure provide an approach to PMI-based data beam nulling with one CSI report.

Embodiments of the present disclosure provide methods for PMI-based data beam nulling with one CSI report, where a shared PMI bitmap is used in PMI feedback for different ranks. Two methods are designed to select an alternative PMI when the reported PMI is restricted. Three options are designed for CQI boosting and precoder generation to optimize performance. Embodiments of the present disclosure can be applied, but not limited, to interference reduction to satellite earth stations, which should be considered in an inclusive manner without exclusion of other use cases.

Figure 2:
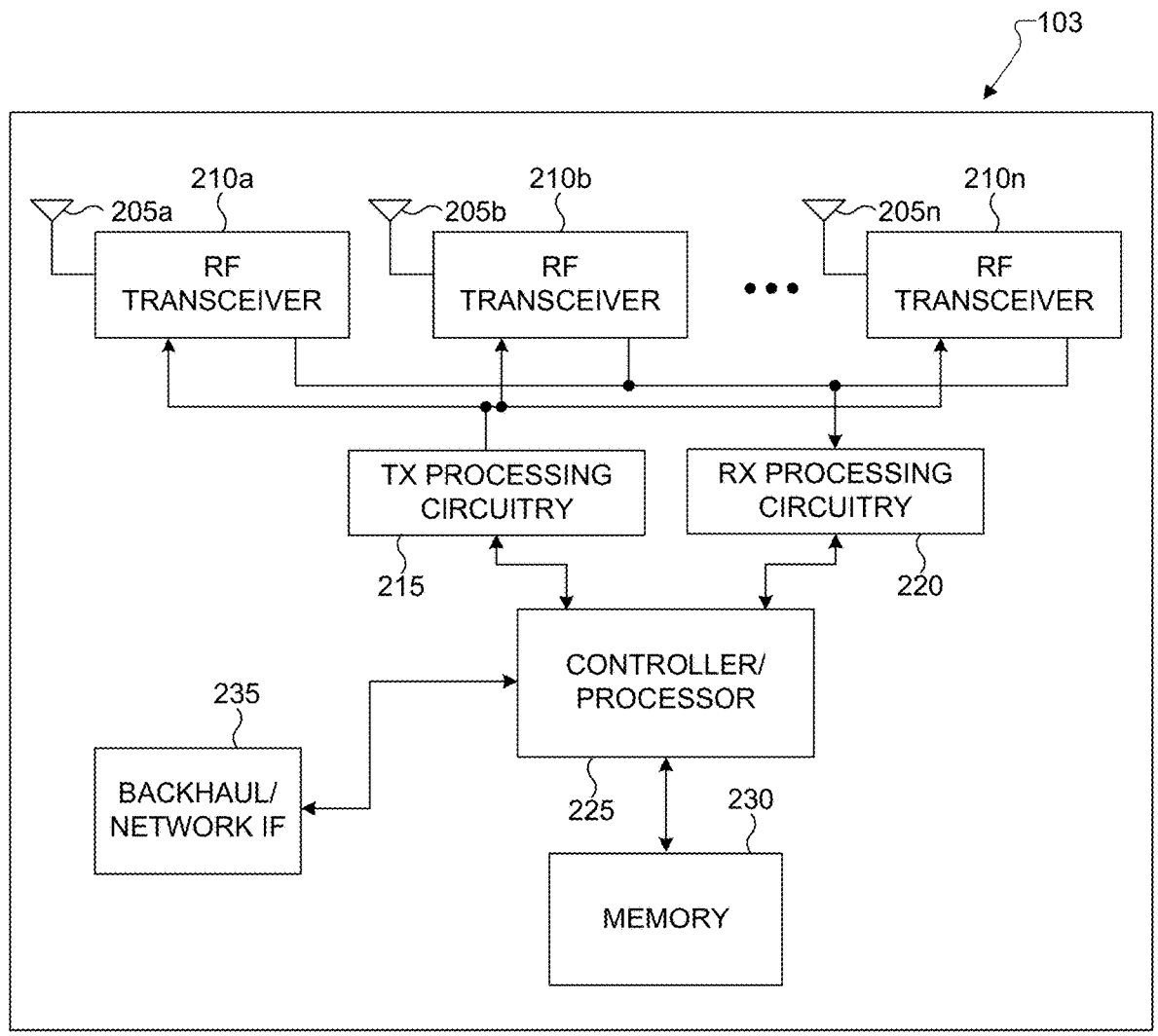
FIG. 2 illustrates an example gNB according to embodiments of the present disclosure.
Figure 3:
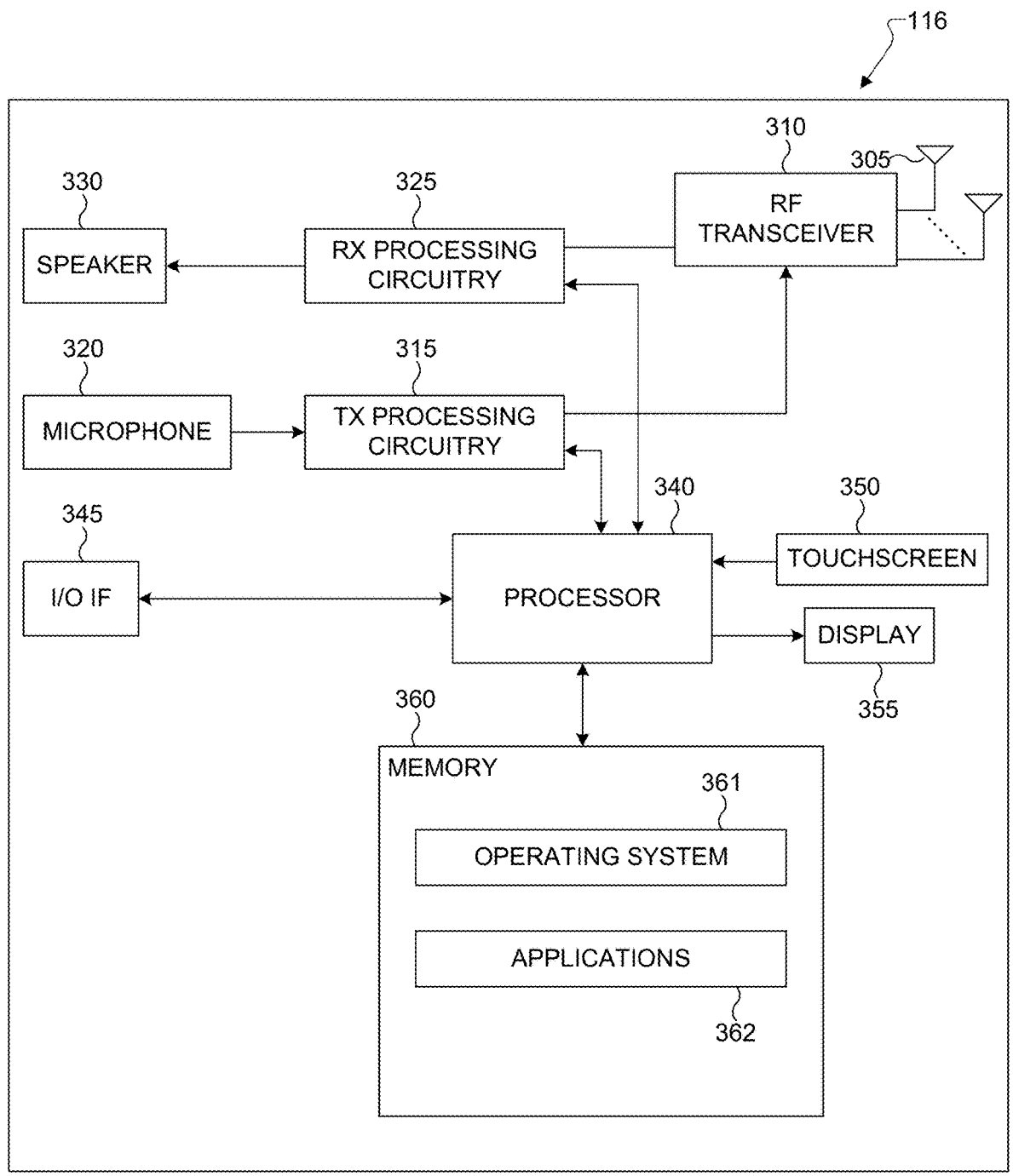
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network. In certain embodiments, the gNB 103 is a non-terrestrial BS. For example, gNB 103 can be a satellite positioned in a geosynchronous equatorial orbit (geostationary orbit, GEO) or in a low earth orbit (LEO). Additionally, gNB 103 can be a satellite orbiting station coupled to a satellite earth station.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The coverage area 125 provided by gNB 103 can be part of a non-terrestrial network (NTN). The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, t the term 'gNB' can refer to any component (or collection of components) configured to provide remote terminals with wireless access to a network, such as base transceiver station, a radio base station, transmit point (TP), transmit-receive point (TRP), an enhanced base station (eNodeB or eNB), a ground gateway, an airborne gNB, a satellite system, mobile base station, a 5G/NR base station (gNB), a macrocell, a femtocell, a WiFi access point (AP), and the like. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for beam directional nulling. In certain embodiments, and one or more of the gNBs 101-103 includes circuitry, programing, or a combination thereof for beam directional nulling.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 103 according to embodiments of the present disclosure. The embodiment of the gNB 103 illustrated in FIG. 2 is for illustration only, and the gNBs 101 and 102 of FIG. 1 could have the same or similar configuration. However, gNBs come in a wide variety of configurations, and FIG. 2 does not limit the scope of this disclosure to any particular implementation of a gNB.

As shown in FIG. 2, the gNB 103 includes multiple antennas 205a-205n, multiple RF transceivers 210a-210n, transmit (TX) processing circuitry 215, and receive (RX) processing circuitry 220. The gNB 103 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 103. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 103 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 103 to communicate with other devices or systems over a backhaul connection or over a network. The interface 235 could support communications over any suitable wireless connection(s). When disposed as part of a terrestrial network, such as gNB 101 and gNB 102, The interface 235 could support communications over any suitable wired or wireless connection(s). For example, when the gNB 103 is implemented as part of a cellular communication system (such as one supporting 5G/NR, LTE, or LTE-A), the interface 235 could allow the gNB 103 to communicate with other gNBs over a wireless backhaul connection while gNB 101 and gNB 102 can communicate with other gNBs over a wired or wireless backhaul connection. When the one or the gNBs 101-103 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of gNB 103, various changes may be made to FIG. 2. For example, the gNB 103, and respectively gNB 101 and 102 as part of terrestrial networks, could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4A:
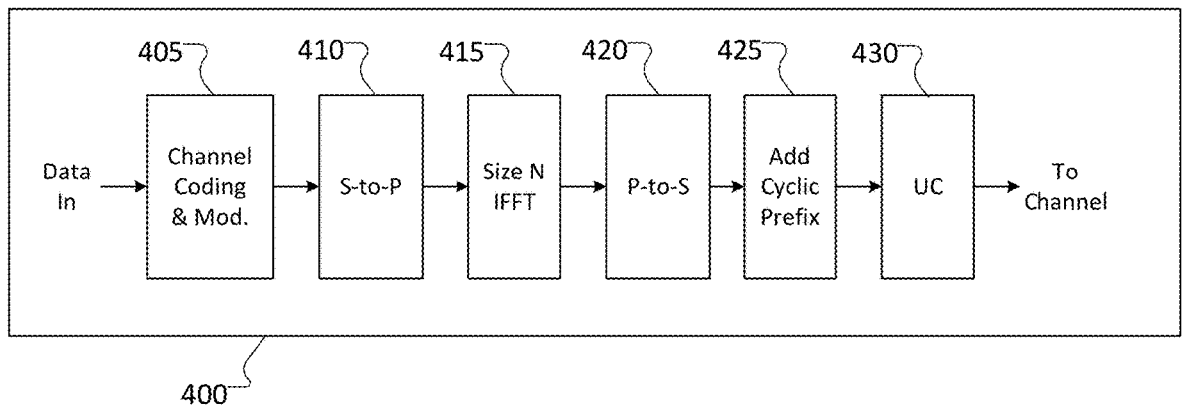
FIGS. 4A and 4B illustrate example wireless transmit and receive paths according to this disclosure.
Figure 4B:
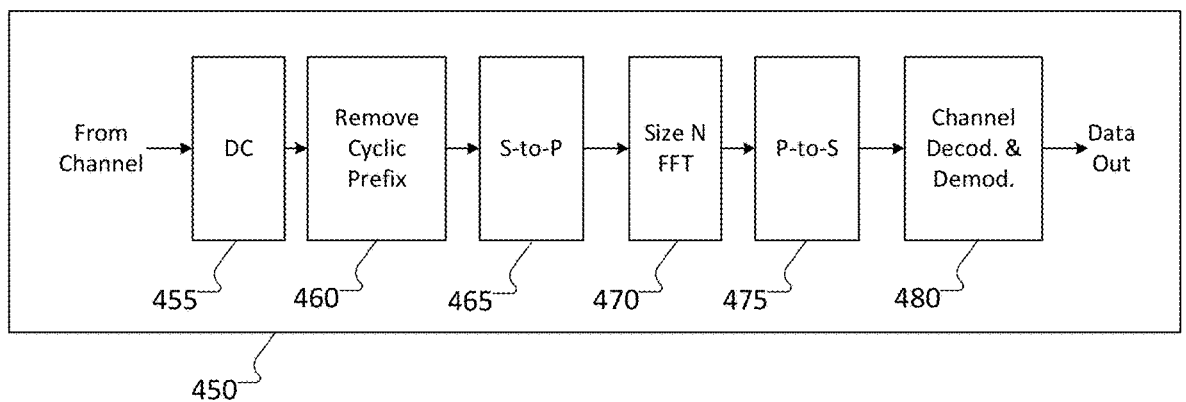

FIG. 4A and FIG. 4B illustrate example wireless transmit and receive paths according to this disclosure. In the following description, a transmit path 400 may be described as being implemented in a gNB (such as the gNB 102), while a receive path 450 may be described as being implemented in a UE (such as a UE 116). However, it may be understood that the receive path 450 can be implemented in a gNB and that the transmit path 400 can be implemented in a UE. In some embodiments, the receive path 450 is configured to support adapting a channel sensing threshold as described in embodiments of the present disclosure.

The transmit path 400 as illustrated in FIG. 4A includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 450 as illustrated in FIG. 4B includes a down-converter (DC) 455, a remove cyclic prefix block 460, a serial-to-parallel (S-to-P) block 465, a size N fast Fourier transform (FFT) block 470, a parallel-to-serial (P-to-S) block 475, and a channel decoding and demodulation block 485.

As illustrated in FIG. 4A, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 4B, the downconverter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time domain signals. The size N FFT block 470 performs an FFT algorithm to generate N parallel frequency-domain signals. The parallel-to-serial block 475 converts the parallel frequency-domain signals to a sequence of modulated data symbols. The channel decoding and demodulation block 485 demodulates and decodes the modulated symbols to recover the original input data stream.

Each of the gNBs 101-103 may implement a transmit path 400 as illustrated in FIG. 4A that is analogous to transmitting in the downlink to UEs 111-116 and may implement a receive path 450 as illustrated in FIG. 4B that is analogous to receiving in the uplink from UEs 111-116. Similarly, each of UEs 111-116 may implement the transmit path 400 for transmitting in the uplink to the gNBs 101-103 and may implement the receive path 450 for receiving in the downlink from the gNBs 101-103.

Each of the components in FIG. 4A and FIG. 4B can be implemented using only hardware or using a combination of hardware and software/firmware. As a particular example, at least some of the components in FIG. 4A and FIG. 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4A and FIG. 4B illustrate examples of wireless transmit and receive paths, various changes may be made to FIG. 4A and FIG. 4B. For example, various components in FIG. 4A and FIG. 4B can be combined, further subdivided, or omitted and additional components can be added according to particular needs. Also, FIG. 4A and FIG. 4B are meant to illustrate examples of the types of transmit and receive paths that can be used in a wireless network. Any other suitable architectures can be used to support wireless communications in a wireless network.

Figure 5:
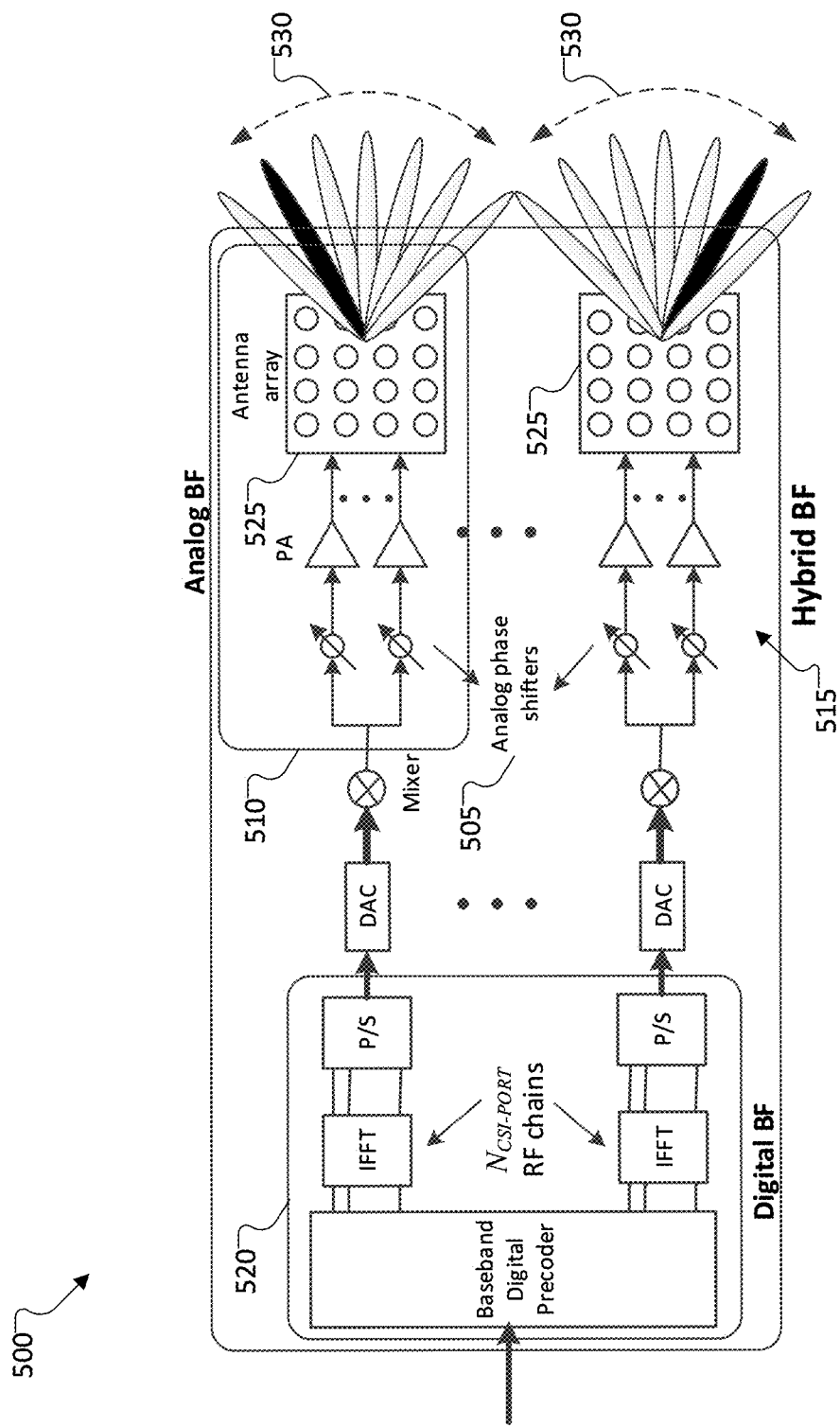
FIG. 5 illustrates an example antenna according to embodiments of the present disclosure.

FIG. 5 illustrates an example antenna 500 according to embodiments of the present disclosure. The embodiment of the antenna 500 illustrated in FIG. 5 is for illustration only. FIG. 5 does not limit the scope of this disclosure to any particular implementation of the antenna 500. In certain embodiments, one or more of gNB 102 or UE 116 include the antenna 500. For example, one or more of antenna 205 and its associated systems or antenna 305 and its associated systems can be configured the same as antenna 500.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies).

In the example shown in FIG. 5, the antenna 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports $N_{CSI-PORT}$. A digital BF (hybrid BF 515) performs a linear combination across $N_{CSI-PORT}$ analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the antenna 500 system is also applicable to higher frequency bands such as >52.6 GHz (also termed the FR4). In this case, the system can employ only analog beams. Due to the O2 absorption loss around 60 GHz frequency (~10 decibels (dB) additional loss @100 m distance), larger number of and sharper analog beams (hence larger number of radiators in the array) will be needed to compensate for the additional path loss.

Figure 6A:
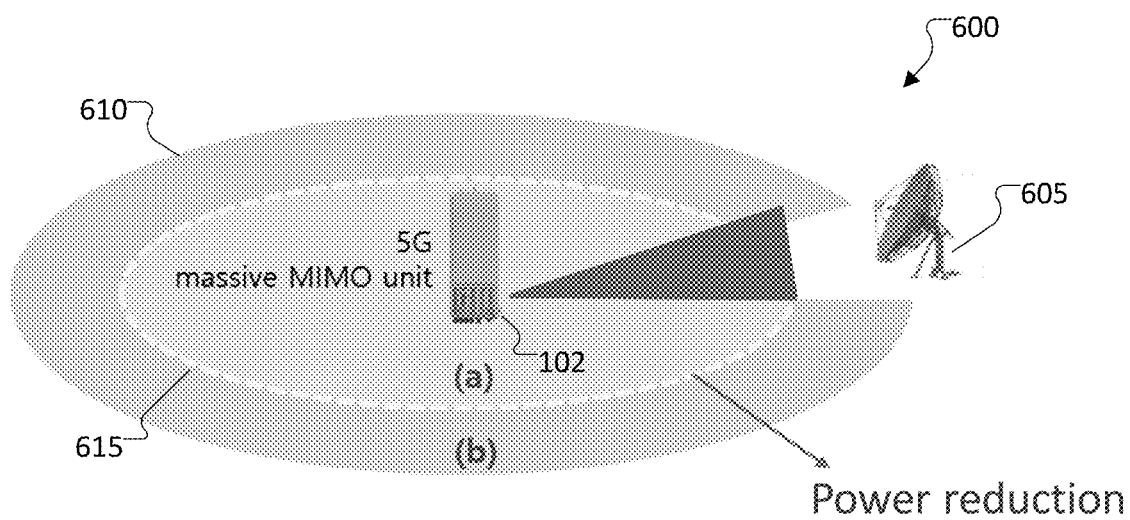
FIGS. 6A and 6B illustrate an example interference reduction in wireless communications network having terrestrial and non-terrestrial stations according to embodiments of the present disclosure.
Figure 6B:
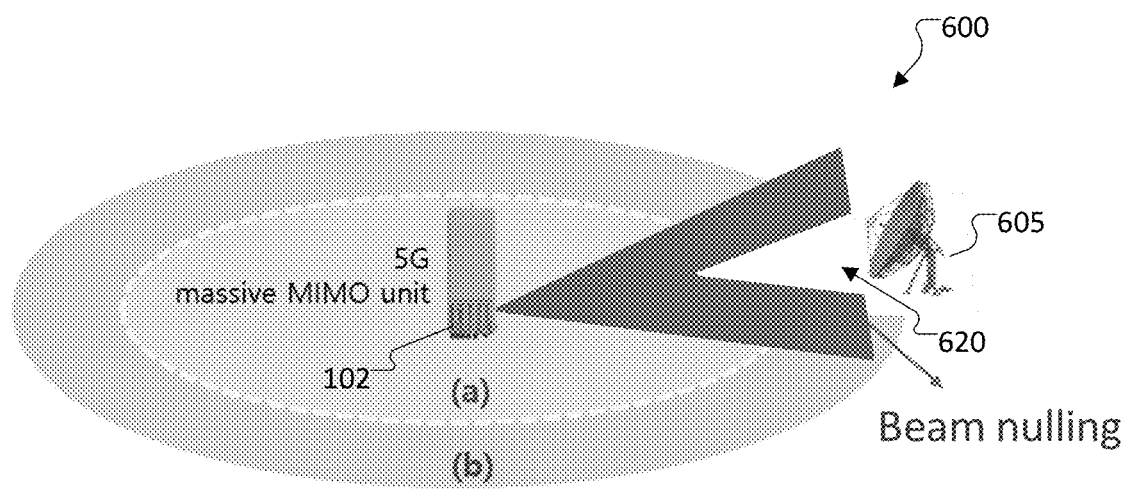

FIGS. 6A and 6B illustrate an example interference reduction in wireless communications network having terrestrial and non-terrestrial stations according to embodiments of the present disclosure. The embodiment of the wireless communications network 600 shown in FIGS. 6A and 6B are for illustration only. Other embodiments could be used without departing from the scope of the present disclosure.

In many cases, cellular networks are deployed in locations where satellite earth-stations (ES) 605 exist. In certain embodiments, ES 605 is configured to perform satellite communications. The ES 605 is primarily deployed to be fixed and receive-only for satellite communication.

Cellular operation bands, such as via gNB 102, can be adjacent to ES 605 operation band. For example, 5G emission, in coverage area 610, from gNB 102 can interfere with the ES 605. Additionally, there are harsh constraints on the amount of interference that 605 can tolerate in their band of operation. That is, the 5G massive MIMO system on C-band can cause some interference to the ES 605 for satellite communication. The Federal Communication Commission (FCC) has implemented regulations on the C-Band emissions. To comply with the FCC regulations, the 5G massive MIMO system needs to be designed to control the interference to the ES 605, namely, for the satellite communication in C-band.

For the coexistence, FCC regulation on C-band emission in USA: 1) Out-of-band Emission (4.0-4.2 GHz)-PFD limit of −124 dBW/m2/MHz as measured at the earth station antenna; or In-band, receiver blocking protection (3.7-3.98 GHz)-PFD limit of −16 dBW/m2/MHz as measured at the earth station antenna. Thus, interference control to earth stations in C-band needs to be addressed for the coexistence of 5G massive MIMO systems and satellite earth stations (ES).

Power reduction is one way to reduce interference to the ES 605, which, however, will cause a smaller coverage and performance degradation. Even though cellular networks are operating in a different adjacent band, out of band (OOB) emission still affects ES 605, hence, transmission power back-off may be required in some cases to avoid OOB interference. In certain scenarios, to mitigate OOB interference, gNB 102 may perform power reduction and transmit to a reduced coverage area 615. In response, the ES 605 continues to measure the interference while gNB 102 continues to reduce the power so that the interference coming from gNB 102 would comply with the regulations. A problem with this power back off is that it deteriorates the through-put. That is, reducing the power to reduce the interference may affect the performance of the system as well.

In certain embodiments, to reduce interference to ES 605 while maintaining coverage in coverage area 610 and mitigating performance degradation, PMI-based data beams can be designed so that the radiation power from gNB 102 is reduced directionally towards the ES 605, referring to as directional nulling.

The data beam can be formed based on the PMI feedback in a CSI report sent by a UE. In order to reduce interference to an ES, the PMIs forming beams pointing to the ES can be restricted so that the data beam is nulled in the ES direction. One CSI report can be configured with only one PMI bitmap, and a UE reports selected PMIs among all allowed PMIs indicated in the bitmap for different ranks. For example, a full PMI bitmap can be configured. For a certain rank value, if the reported PMIs belong to the set of restricted PMIs, alternative PMIs have to be selected at the BS to generate the data beam. In certain embodiments, PMI-based MIMO transmission, data beam can be generated based on CSI measurement report consisting of channel quality indicator (CQI), preceding matrix indicator (PMI), and rank indicator (RI), where the PMIs indicates UE-selected beam directions. To null data beam in ES direction, PMIs pointing to the ES are restricted.

In PMI-based MIMO transmission, data beams can be generated based on UE CSI measurement on downlink CSI-RS, which consists of CQI, PMI, and RI feedback through uplink. The interference from MMUs to an ES can be reduced directionally by restricting PMIs forming data beams pointing to the ES. UE may only select and report unrestricted PMIs that are informed by the BS via a PMI bitmap parameter with 1 indicating allowed PMI beam and 0 indicating restricted PMI beam. For different ranks, the restricted PMIs can be different. However, due to limited capacity of control channel, a shared PMI bitmap is used for different ranks in one CSI report configuration. The reported PMIs for lower ranks could fall in ES nulling direction and, thus, need to be restricted and replaced by alternative ones. It is necessary to design the approach to data beam nulling in PMI-based MIMO transmission with one CSI report.

Figure 7:
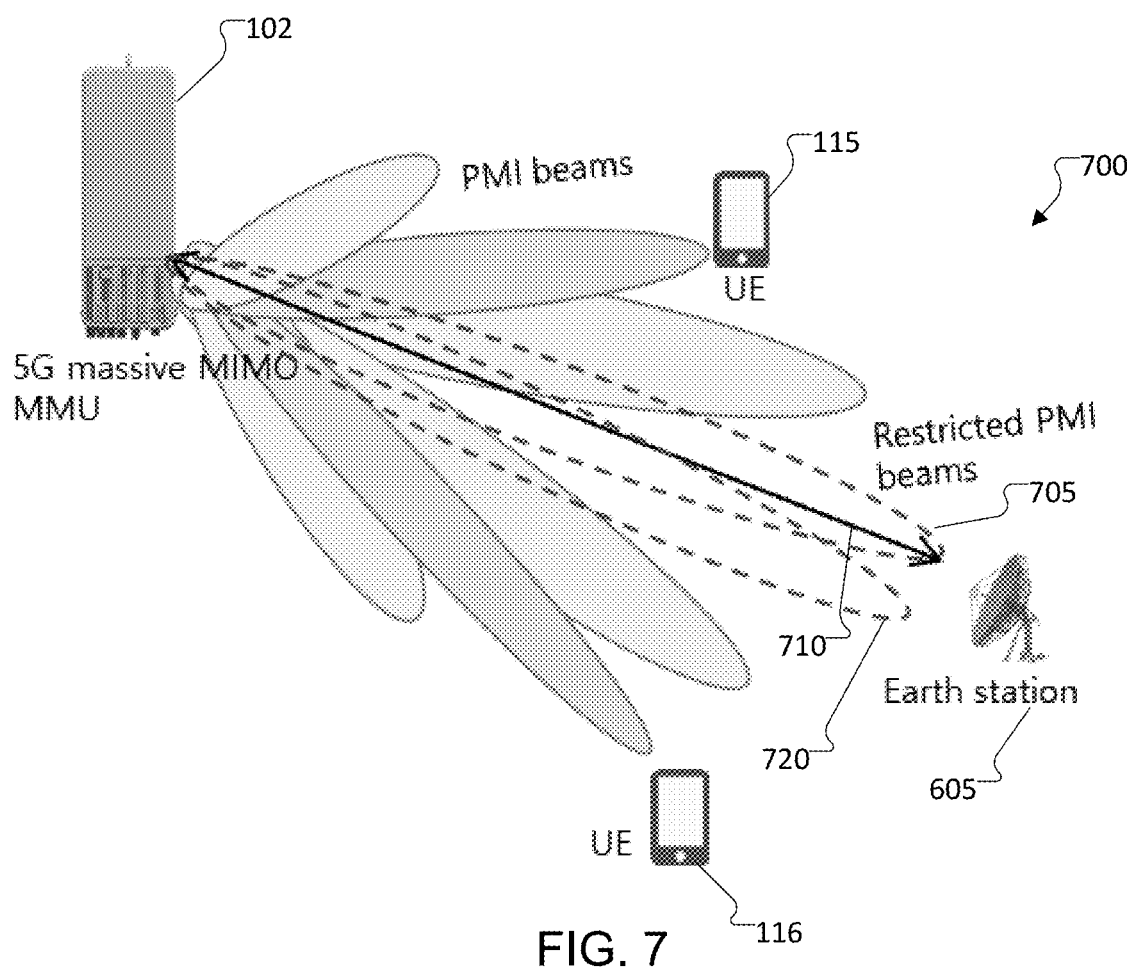
FIG. 7 illustrates an example for data beam nulling according to embodiments of the present disclosure.

FIG. 7 illustrates an example for data beam nulling according to embodiments of the present disclosure. The embodiment of the data beam nulling 700 shown in FIG. 7 is for illustration only. Other embodiments could be used without departing from the scope of the present disclosure.

In certain embodiments, gNB 102 generates a data beam 705 containing k data streams to a UE 116 while nulling in the ES 605 direction 710, a rank-k precoder (i.e., beamforming matrix) consisting of k orthogonal beamforming vectors can be designed via zero-forcing (ZF) beamforming. The gNB 102 forms the data beam with zero power leakage (interference) in the ES 605 direction 710 while maintaining beam radiation towards the UE 116.

The gNB 102 has prior knowledge of ES 605, namely ES direction 710, location, etc., the gNB 102 identifies restricted PMIs. The gNB 102 configures a PMI bitmap with 1 indicating allowed PMI and 0 indicating restricted PMI, and the UE 116 will select and report only from the unrestricted PMIs.

In certain embodiment, the data beam 705 can be formed based on the PMI feedback in a CSI report sent by a UE 116. In order to reduce interference to an ES 605, the PMIs forming beams 720 pointing to the ES 605 can be restricted so that the data beam 705 is nulled in the ES direction 710. One CSI report is configured with only one PMI bitmap, and a UE 116 reports selected PMIs among all allowed PMIs indicated in the bitmap for different ranks. For example, a full PMI bitmap can be configured. For a certain rank, if the reported PMIs belong to the set of restricted PMIs, alternative PMIs have to be selected at the gNB 102 to generate the data beam 705. For a fixed set of restricted PMIs, a mapping between restricted PMIs and alternative PMIs can be pre-defined. If reduced transmit power is configured, the reported CQI measured based on power-reduced CSI-RSs need to be boosted for MCS selection, if directionally nulled data beam is used. The directionally nulled data beam can be generated causing limited interference to ES direction 710, based on the reported PMI if unrestricted or the alternative PMI if restricted PMI is reported. Alternatively, based on the reported PMI, the data beam with reduced transmit power can be generated if better performance can be achieved, which causes reduced power radiation in all directions.

For beam generating for different ranks, the PMI bitmaps are different. To reduce overhead in control channel or due to system capability, gNB 102 can set only one CSI report configuration, so that a single PMI bitmap is configured for the UE 116 to report PMIs for different ranks.

In this case, the configured PMI bitmap may not accurately indicate restricted and unrestricted PMIs for a certain rank, that is, although a reported PMI is unrestricted according to the configured PMI bitmap, the reported PMI may actually need to be restricted and replaced by alternative ones by the BS.

On the other hand, the reported CQI can be measured based on power-reduced CSI-RS if power-reduced CSI-RS is used by the BS for ES interference control, so reported CQI may not be proper for full-power beam generation. To transmit a full-power data beam directionally nulled in ES direction, the reported CQI has to be boosted for MCS (Modulation Coding Scheme) selection.

Regarding these two issues, embodiments of the present disclosure provide an approach to PMI-based data beam nulling with one CSI report.

Figure 8:
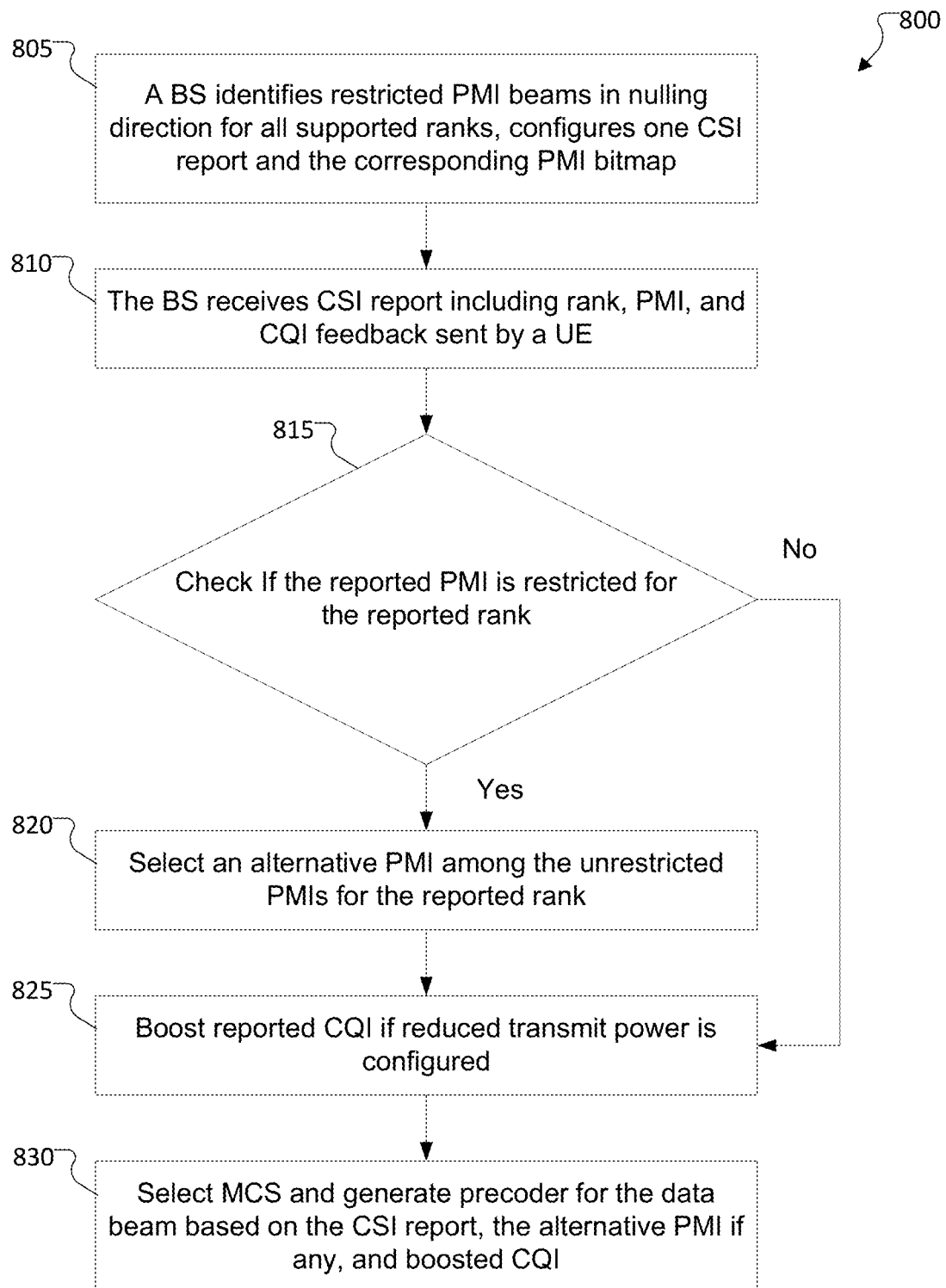
FIG. 8 illustrates processes for PMI-based data beam nulling with one CSI report according to embodiments of the present disclosure.

FIG. 8 illustrates processes for PMI-based data beam nulling with one CSI report according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 800 depicted in the example depicted is implemented by a processor and transmitter chain in, for example, a base station.

In operation 805, gNB 102 identifies one or more restricted PMI beams in nulling direction for all supported ranks. The gNB 102 also configures one CSI report and a corresponding PMI bitmap.

In operation 810, gNB 102 receives a CSI report from UE 116. The CSI report includes a rank, PMI, and CQI feedback sent by UE 116.

In operation 815, gNB 102 checks whether the reported PMI is restricted for the reported rank. If the reported PMI is restricted, then gNB 102 proceeds to select an alternative PMI in operation 820. Alternatively, if the reported PMI is not restricted, then gNB 102 proceeds to boost the reported CQI in operation 825.

In operation 820, gNB 102 selects an alternative PMI among the unrestricted PMIs for the reported rank. For a CSI report with RI=1 and 1-layer PMI feedback, if the reported PMI is restricted, the alternative PMI can be selected from the unrestricted PMIs as follows. For one embodiment of alternative PMI selection, denote $v_k$ as the normalized vector corresponding to the reported PMI for a certain layer, with k as the index of the vector, where $0 \le k \le 255$, for example, for Type-I 1-layer and 2-layer codebook with codebookMode=1, ($N_1=4$, $N_2=4$) and ($O_1=4$, $O_2=4$), and as specified in 3GPP, TS 38.214 v16.3.0, Physical layer procedures for data, the contents of which are incorporated by reference.

The index set of beam vectors corresponding to unrestricted PMIs is denoted S. In certain embodiments, if the reported PMI $v_k$ is restricted, an alternative PMI, denoted $v_{k'}$ is selected that is the one mostly correlated (nearest in direction) to $v_k$ among the unrestricted PMIs. For example, the alternative PMI beam, denoted $v_{k'}$, is selected to be the one mostly correlated to $v_k$ among the unrestricted beams according to Equation 1:

$$k' = \underset{n \in S}{\operatorname{argmax}} \|v_k^H * v_n\|. \quad (1)$$

In certain embodiments of alternative PMI selection, gNB 102 determines the alternative PMI beam $v_{k'}$ as the nearest beam to $v_k$ in parameter domain, such as, nearest with respect to a 2-dimensional index of PMI. Specifically, given a reported PMI and the corresponding beam weight vector $v_k$, the index k can be represented using horizontal and vertical indices, $l_k$ and $m_k$, respectively, where:

$$k=(m_k-1)*N_1O_1+l_k, \text{ for } 0 \leq l_k \leq N_1O_1-1, 0 \leq m_k \leq N_2O_2-1, \quad (2)$$

For example, a Type-I codebook with codebookMode=1, as specified in 3GPP, TS 38.214 v16.3.0, Physical layer procedures for data.

In certain embodiments, for rank>1, multiple PMIs are reported where each PMI is for each layer. The alternative PMI can be selected for each layer independently by selecting from:

Option 1: all the unrestricted PMIs; or
Option 2: the subset of all unrestricted PMIs that guarantees the orthogonality between layers.

The rank of beam can be determined as the reported RI or based on a performance metric, such as, an estimated rate.

In operation 825, gNB 102 boosts the reported CQI if a reduced transmit power is configured. CQI is measured and reported based on power-reduced CSI-RS if reduced transmit power is configured for ES interference control. To transmit a full-power data beam directionally nulled in ES direction 710, the reported CQI is boosted for MCS selection, and the precoder generated based on the reported PMI or the selected alternative PMI is boosted in power if reference signal (RS) for CSI measurement is configured with reduced transmit power.

Figure 9:
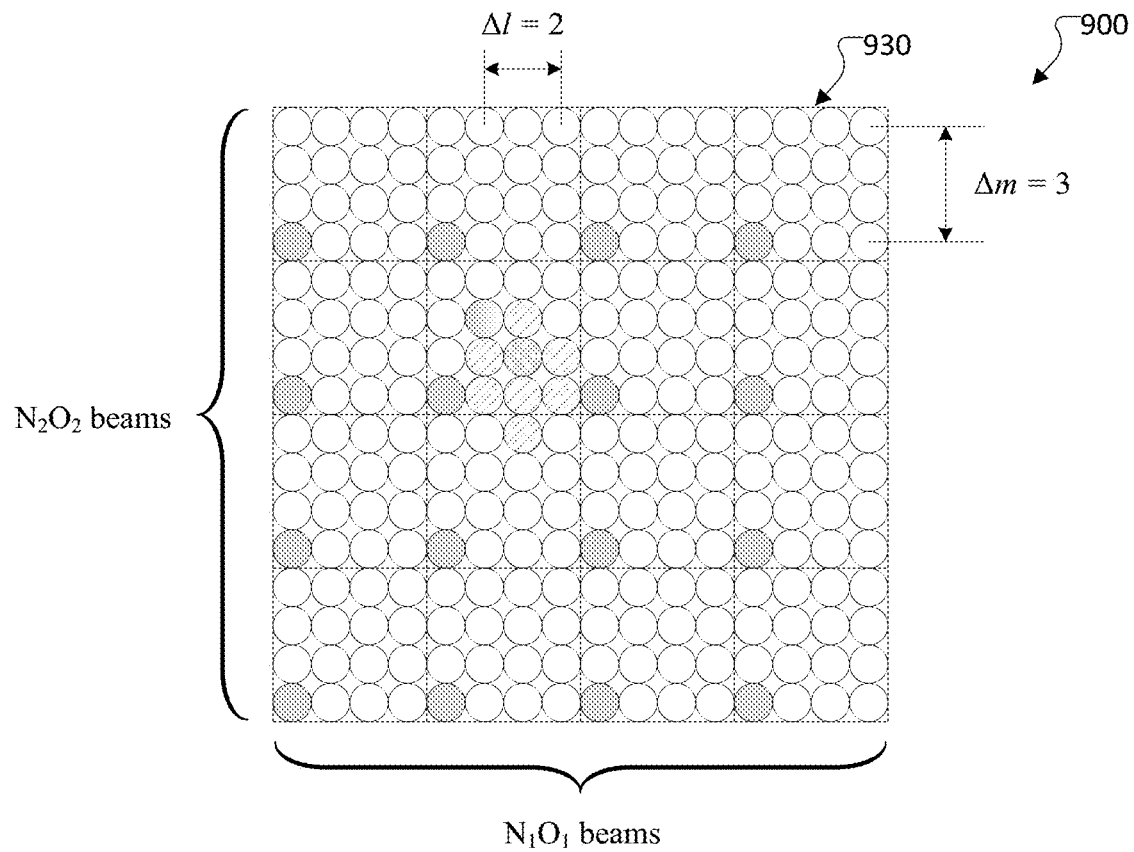
FIG. 9 illustrates an example of alternative PMI selection according to embodiments of the present disclosure.
Figure 9:
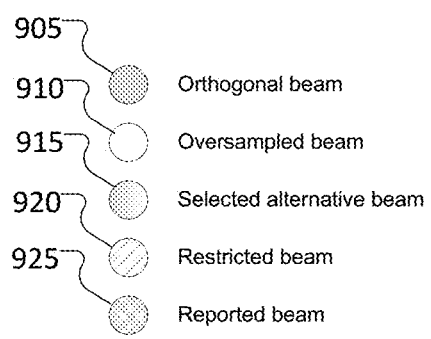

FIG. 9 illustrates an example of alternative PMI selection according to embodiments of the present disclosure. The embodiment of the alternative PMI selection 900 shown in FIG. 9 is for illustration only. Other embodiments could be used without departing from the scope of the present disclosure.

In the example shown in FIG. 9, a set of 256 weight vectors for Type-I 1-layer and 2-layer codebook with ($N_1$=4, $N_2$=4) and ($O_1$=4, $O_2$=4) is depicted. The 256 weight vectors include orthogonal beams 905, oversampled beams 910, selected alternative beams 915, restricted beams 920, and reported beams 925. The set of correlated oversampled beams 910 that $v_k$ belongs to can be identified based on the beam index ($l_k$, $m_k$). Every 16 beams within a square 930 is a set of oversampled beams 910. Among the oversampled beams 910, the set of unrestricted beams can be determined by intersecting to the set of all unrestricted beams, $S$, and denoted $S_o$. If the set $S_o$ is not empty, the alternative beam $v_{k'}$ is selected to be the one closest to $v_k$ in $S_o$ in terms of index distance, that is, according to Equation 3:

$$k' = \underset{n \in S_o}{\operatorname{argmin}} \sqrt{(l_k - l_n)^2 + (m_k - m_n)^2}, \quad (3)$$

where ($l_k$, $m_k$) and ($l_n$, $m_n$) denote the two-dimension representations of indices k and n, respectively. If the set $S_o$ is empty, the alternative beam $v_{k'}$ is selected among all unrestricted beams according to Equation 4:

$$k' = \underset{n \in S}{\operatorname{argmin}} \sqrt{(l_k - l_n)^2 + (m_k - m_n)^2}, \quad (4)$$

For a CSI report with RI>1 and multi-layer PMI feedback, the alternative PMI can be selected for each layer independently using the method mentioned above, where the rank of the data beam is as the reported RI. For another embodiment, if the reported PMI of a certain layer is restricted in a CSI report with RI>1, the alternative PMI can be selected for the layer independently by the method above, and the rank of the data beam can be selected from {1, 2, ..., RI} based on a performance metric g, which can be a function of CSI. For example, the rank r can be determined according to Equation 5:

$$r = \underset{n \in \{1,2,...,RI\}}{\operatorname{argmax}} g_n, \quad (5)$$

where $g_n$ be the estimated achievable rate, i.e., $g_n$(n, $CQI_n$) =n*$\log_2$ (1+B*$CQI_n$), where B denotes a scalar determined in the outer loop error rate, and $CQI_n$ denotes the CQI of rank-n data beam. The CQI of rank-RI data beam can be the reported CQI. The CQI of rank-n data beam can be determined based on the n-layer PMI for n<RI, where the PMI is not reported but can be selected from the unrestricted PMIs corresponding to the rank-n PMI bitmap using the method mentioned above.

Figure 10:
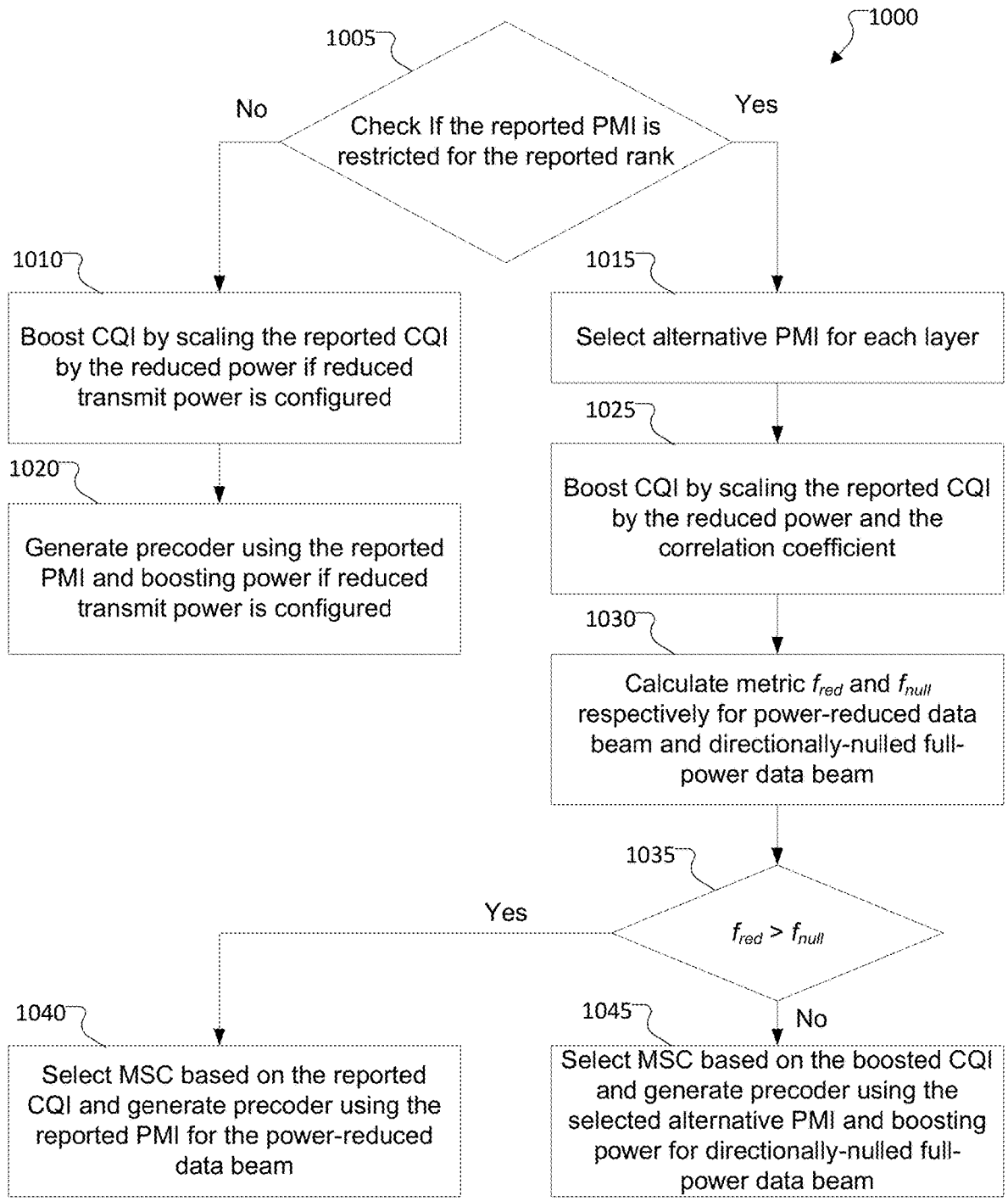
FIG. 10 illustrates a process for channel quality indicator (CQI) boosting and data beam precoder generation according to embodiments of the present disclosure.

FIG. 10 illustrates a process for channel quality indicator (CQI) boosting and data beam precoder generation according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 800 depicted in the example depicted is implemented by a processor and transmitter chain in, for example, a base station.

CQI is measured and reported based on power-reduced CSI-RS if reduced transmit power is configured for ES interference control. To transmit a full-power data beam directionally nulled in ES direction, the reported CQI is boosted for MCS selection, and the precoder generated based on the reported PMI or the selected alternative PMI has to be boosted in power if reference signal (RS) for CSI measurement is configured with reduced transmit power. CQI boosting is performed via one of three options:

Option 1: CQI is boosted by scaling up the reported CQI to full power regardless the reported PMI is restricted or not.

Option 2: If the reported PMI is unrestricted, the reported CQI is scaled up to full power;

If the reported PMI is restricted, the CQI is first scaled up to full power, and further scaled by the correlation coefficient (i.e., ω) between the reported PMI beam $v_k$ and the selected alternative PMI beam $v_{k'}$, where:

$$\omega = \|v_k^{H*} v_{k'}\|. \quad (6)$$

Option 3: If the reported PMI is unrestricted, CQI is boosted by option 2 and the precoder is generated using the reported PMI with boosted power. If the reported PMI is restricted, choose either the power-reduced data beam or the directionally nulled full-power data beam based on a performance metric such as estimated achievable rate:

$$f_{red}(r, CQI_{rep}) = r * \log_2(1 + B * CQI_{rep}) \quad (7)$$

$$f_{full}(r, CQI_{boost}) = r * \log_2(1 + B * CQI_{boost}) \quad (8)$$

where r is reported RI; B denotes a scalar for the outer loop error rate

In operation 1005, gNB 102 checks whether the reported PMI is restricted for the reported rank. If the reported PMI is unrestricted, then gNB 102 proceeds to option 1, which is boost by scaling in operation 1010. Alternatively, if the reported PMI is restricted, then gNB 102 proceeds to select an alternative PMI in operation 1015.

In certain embodiments, a scaling value is used to boost the reported CQI in operation 1010. In certain embodiments, the boosted CQI is obtained by scaling the reported CQI by the reduced power no matter if the reported PMI is restricted or not. The MCS is selected based on the boosted CQI. Then, in operation 1020, the precoder is generated using the reported PMI if unrestricted or the selected alternative PMI if restricted PMI is reported. The power of the precoder is boosted to full power if reference signal (RS) for CSI measurement is configured with reduced transmit power.

In certain embodiments, in operation 1010, if the reported PMI is unrestricted, the reported CQI is scaled by the reduced power. Then, in operation 1020, the precoder is generated using the reported PMI and boosting power if reduced transmit power is configured.

If the reported PMI is restricted and an alternative PMI is selected for each layer in operation 1015, the CQI is first scaled by the reduced power in operation 1025. The CQI is further scaled by the correlation coefficient between the reported PMI beam $v_k$ and the selected alternative PMI beam $v_{k'}$, denoted ω, namely Equation 6 above, where $\omega = \|v_k^{H*} v_{k'}\|$. The MCS is selected based on the boosted CQI. The precoder is generated using the reported PMI if unrestricted or the selected alternative PMI if restricted PMI is reported. The power of the precoder is boosted to full power if reference signal (RS) for CSI measurement is configured with reduced transmit power.

In certain embodiments, if the reported PMI is unrestricted, the MCS is selected based on the boosted CQI and the precoder is generated using the reported PMI with boosted power if reference signal (RS) for CSI measurement is configured with reduced transmit power.

If the reported PMI is restricted, gNB 102 selects an alternative PMI for each layer in operation 1015. In operation 1025, gNB 102 boosts the CQI by scaling the reported CQI by the reduced power and the correlation coefficient. In operation 1030, gNB 102 calculates metrics for the data beam. Either a power-reduced data beam or the directionally nulled full-power data beam is used, whichever provides better estimated performance measured by a metric f, which can be a function of CSI. In an example, the metric f can be the estimated achievable rate, such as according to Equation 9:

$$f(r, CQI) = r * \log_2(1 + B * CQI), \quad (9)$$

In Equation 9, r can be the reported RI and B denotes a scalar determined in an outer loop error rate. For the power-reduced data beam, gNB 102 calculates the metric $f_{red}$ based on the reported CSI, including the reported PMI and the reported CQI. For the directionally nulled full-power data beam, gNB 102 calculates the metric $f_{null}$ based on the selected alternative PMI and the boosted CQI, that is, the reported CQI scaled by the reduced power and the correlation coefficient ω.

In operation 1035, gNB 102 compares $f_{red}$ and $f_{null}$. If $f_{red} > f_{null}$, a power-reduced data beam is used in operation 1040. In operation 1040, the precoder is generated based on the reported PMI and the MCS is selected based on the reported CQI. If $f_{red} \leq f_{null}$, a directionally nulled full-power data beam is used in operation 1045. In operation 1045, the precoder is generated using the selected alternative PMI and the power is boosted to full power if PDSCH is configured with reduced transmit power. The MCS is selected based on the boosted CQI, that is, the reported CQI scaled by the reduced power and the correlation coefficient ω.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
    a transceiver configured to communicate via a wired or wireless communication medium; and
    a processor operably coupled to the transceiver, the processor configured to:
        identify restricted precoding matrix indicator (PMI) beams in a nulling direction for supported ranks;
        receive, via the transceiver from a user equipment (UE), a channel state information (CSI) report including a rank, a PMI, and channel quality indicator (CQI) feedback;
        determine whether the reported PMI is restricted;
        select an alternative PMI among a number of unrestricted PMIs for the reported rank;
        boost a reported CQI if a reduced transmit power is configured; and
        select a modulation coding scheme (MCS) and generate a precoder for a data beam based on at least one of: the CSI report, the alternative PMI, and the boosted CQI.

2. The apparatus of claim 1, wherein when the reported PMI is restricted, the processor is configured to select, from the unrestricted PMI, a PMI that is correlated in a nearest direction to the reported PMI as the alternative PMI.

3. The apparatus of claim 1, wherein when the reported PMI is restricted, the processor is configured to select, from the unrestricted PMI, a PMI that is correlated in a nearest parameter domain to the reported PMI as the alternative PMI.

4. The apparatus of claim 3, wherein the nearest parameter domain comprises a nearest spatial domain.

5. The apparatus of claim 3, wherein:
for a rank value greater than 1, the reported PMI comprises multiple PMIs,
each of the multiple PMIs corresponds to a respective layer, and
the alternative PMI is selected for each of the respective layers by one of:
selecting from all unrestricted PMIs; or
selecting from a subset of all unrestricted PMIs that guarantee an orthogonality between layers.

6. The apparatus of claim 1, wherein the processor is configured to determine a rank of the data beam as a reported rank indicator (RI) or based on a performance metric.

7. The apparatus of claim 1, wherein the processor is configured to boost the reported CQI by scaling up the reported CQI independent of whether the reported PMI is restricted.

8. The apparatus of claim 1, wherein the processor is configured to one of:
when the reported PMI is unrestricted, boost the reported CQI by scaling up the reported CQI to a full power; or
when the reported PMI is restricted, boost the reported CQI by first scaling up to the full power and further scaling by a correlation coefficient between the reported PMI and the alternative PMI.

9. The apparatus of claim 1, wherein the processor is configured to, when reported PMI is restricted:
estimate a performance metric for a first beam generated with the reported CQI and the reported PMI,
estimate a same performance metric for a second beam generated with the boosted CQI and the alternative PMI,
generate one of the first and second beams that has a better estimated performance.

10. A method comprising:
identifying restricted precoding matrix indicator (PMI) beams in a nulling direction for supported ranks;
receiving, from a user equipment (UE), a channel state information (CSI) report including a rank, a PMI, and channel quality indicator (CQI) feedback;
determining whether the reported PMI is restricted;
selecting an alternative PMI among a number of unrestricted PMIs for the reported rank;
boosting a reported CQI based on a reduced transmit power being configured; and
selecting a modulation coding scheme (MCS) and generating a precoder for a data beam based on at least one of: the CSI report, the alternative PMI, and the boosted CQI.

11. The method of claim 10, wherein selecting the alternative PMI comprises, based on the reported PMI being restricted, selecting, from the unrestricted PMI, a PMI that is correlated in a nearest direction to the reported PMI as the alternative PMI.

12. The method of claim 10, wherein selecting the alternative PMI comprises, based on the reported PMI being restricted, selecting, from the unrestricted PMI, a PMI that is correlated in a nearest parameter domain to the reported PMI as the alternative PMI.

13. The method of claim 12, wherein the nearest parameter domain comprises a nearest spatial domain.

14. The method of claim 12, wherein:
for a rank value greater than 10, the reported PMI comprises multiple PMIs,
each of the multiple PMIs corresponds to a respective layer, and
the alternative PMI is selected for each of the respective layers by one of:
selecting from all unrestricted PMIs; or
selecting from a subset of all unrestricted PMIs that guarantee an orthogonality between layers.

15. The method of claim 10, further comprising determining a rank of the data beam as a reported rank indicator (RI) or based on a performance metric.

16. The method of claim 10, wherein boosting the reported CQI comprises boosting the reported CQI by scaling up the reported CQI independent of whether the reported PMI is restricted.

17. The method of claim 10, wherein boosting the reported CQI comprises one of:
when the reported PMI is unrestricted, boosting the reported CQI by scaling up the reported CQI to a full power; or
when the reported PMI is restricted, boosting the reported CQI by first scaling up to the full power and further scaling by a correlation coefficient between the reported PMI and the alternative PMI.

18. The method of claim 10, further comprising, based on the reported PMI being restricted:
estimating a performance metric for a first beam generated with the reported CQI and the reported PMI,
estimating a same performance metric for a second beam generated with the boosted CQI and the alternative PMI,
generating one of the first and second beams that has a better estimated performance.

19. A non-transitory computer readable medium comprising program code, that when executed by a processor of an apparatus, causes the apparatus to:
identify restricted precoding matrix indicator (PMI) beams in a nulling direction for supported ranks;
receive, via a transceiver of the apparatus from a user equipment (UE), a channel state information (CSI) report including a rank, a PMI, and channel quality indicator (CQI) feedback;
determine whether the reported PMI is restricted;
select an alternative PMI among a number of unrestricted PMIs for the reported rank;
boost a reported CQI if a reduced transmit power is configured; and
select a modulation coding scheme (MCS) and generate a precoder for a data beam based on at least one of: the CSI report, the alternative PMI, and the boosted CQI.

20. The non-transitory computer readable medium of claim 19, wherein the program code to select the alternative PMI comprises program code, that when executed by the processor of the apparatus, causes the apparatus to, when the reported PMI is restricted, select, from the unrestricted PMI, a PMI that is correlated in a nearest direction or a nearest parameter domain to the reported PMI as the alternative PMI.

* * * * *